United States Patent [19]

Coates et al.

[11] 4,089,819

[45] May 16, 1978

[54] PROCESS OF PREPARING VESICULATED POLYESTER RESIN GRANULES

[75] Inventors: Roger Hampton Coates, Vermont; John Gillan, Noble Park, both of Australia

[73] Assignee: Dulux Australia Limited, Australia

[21] Appl. No.: 831,523

[22] Filed: Sep. 8, 1977

Related U.S. Application Data

[63] Continuation of Ser. No. 670,942, Mar. 26, 1976, abandoned.

[30] Foreign Application Priority Data

Apr. 21, 1975 Australia ............................... 1318/75

[51] Int. Cl.$^2$ ................................................ C08J 9/28
[52] U.S. Cl. .............................. 260/2.5 N; 260/2.5 L; 260/2.5 B; 260/29.6 RB; 260/29.6 NR
[58] Field of Search .............. 260/2.5 N, 2.5 B, 2.5 L, 260/29.6 RU, 29.6 NR

[56] References Cited

U.S. PATENT DOCUMENTS

| | | | |
|---|---|---|---|
| 3,255,127 | 6/1966 | Von Bonin | 260/2.5 N |
| 3,442,842 | 5/1969 | Von Bonin | 260/2.5 N |
| 3,740,255 | 6/1973 | Fox | 260/2.5 N |
| 3,879,314 | 4/1975 | Gunning et al. | 260/29.6 NR |
| 3,923,704 | 12/1975 | Gunning et al. | 260/29.6 NR |
| 3,950,287 | 4/1976 | Coates | 260/29.6 NR |
| 3,979,342 | 9/1976 | Baidens et al. | 260/29.6 NR |

*Primary Examiner*—Morton Foelak
*Attorney, Agent, or Firm*—Cushman, Darby & Cushman

[57] ABSTRACT

A process of preparing vesiculated polyester resin granules in which self-stabilizing and self-vesiculating disperse particles of an unsaturated polyester resin, wherein the polyester contains 2–50% of poly(ethylene oxide) of average molecular weight 1,000 to 10,000, are polymerized in an aqueous medium to polymeric vesiculated granules. The aqueous slurry of granules may be dried to a soft powder. These granules are useful as a component in paint.

6 Claims, No Drawings

PROCESS OF PREPARING VESICULATED POLYESTER RESIN GRANULES

This is a continuation, of application Ser. No. 670,942 filed Mar. 26, 1976, now abandoned.

This invention relates to a novel process of preparing vesiculated polyester resin granules.

It has been proposed that granules of vesiculated polymer with diameters of the order of 0.5 to 500 micron be used as matting and texturing agents in paints and plastics and as fillers in paper. Granules of this general type are described in, for example, Australian patent specification No. 439,432, in which it is further disclosed that the ratio of granule diameter to vesicle diameter should be at least 5/1.

Australian patent specification No. 455,277 discloses that useful vesiculated cross-linked polyester resin granules can be prepared from selected carboxylated unsaturated polyester resins by a process which involves the emulsification of an unsaturated monomer, for example styrene, in water in the presence of a strong base, followed by curing of the resin. Particles of pigment can be incorporated in the granules by first pigmenting the polyester resin solution and by a double-emulsion technique, in which a dispersion of the pigment in water is first suspended in droplet form within the unsaturated polyester resin solution. That suspension in turn is dispersed in bead form in water.

The beads are stabilised by the presence of a water-soluble polymer, for example a partially hydrolysed poly (vinyl acetate), in the external water phase. Curing of the unsaturated polyester resin is initiated in conventional manner, e.g. by the use of free-radicle initiators. The resultant product is an aqueous slurry of vesiculated cross-linked polyester resin granules.

While vesiculated granules in the form of aqueous slurries may be well suited to direct incorporation into aqueous products, for example aqueous latex paints, without first extracting and drying the granules, this step clearly cannot be avoided when preparing non-aqueous end products. The presence of water-soluble polymeric stabiliser or protective colloid in the slurries can introduce undesirable economic and technical complications into the extraction and drying process, so that when anhydrous granules are required it would be desirable to eliminate or drastically reduce the use of such a water-soluble polymeric component.

We have now discovered a process of preparing vesiculated polyester resin granules whereby certain of the existing limitations of known processes can be avoided. The granules so-prepared have certain important and surprising advantages over vesiculated polyester resin granules hitherto known in the art.

The process we now disclose involves the use of an unsaturated polyester resin in which is incorporated chains of poly(ethylene oxide). This resin co-reacts in known manner with ethylenically unsaturated monomer. Furthermore, a solution of the resin in ethylenically unsaturated monomer on agitation with water forms a self-stabilised globular dispersion of the resin solution in water and the individual globules spontaneously acquire a vesiculated structure.

Accordingly we now provide a process of preparing an aqueous slurry of vesiculated polyester resin granules by stirring into water a solution of an unsaturated polyester resin in ethylenically unsaturated monomer to form a dispersion in the water of globules of the unsaturated polyester resin solution and then adding to the dispersion a free radical initiator to initiate co-reaction of the unsaturated monomer, the process being further characterised in that;

(1) the polyester resin shall comprise from 2-50% by weight of poly(ethylene oxide) chains of average molecular weight 1000 – 10,000 which are water soluble at the granule processing temperature and (2) the ethylenically unsaturated monomer shall have a solubility of less than 5% by weight in water.

The polyester resin granules may be separated from the water of the slurry and dried.

Unsaturated polyester resins which co-react with ethylenically unsaturated monomer to give a cross-linked polymer structure are, as a class, well known to the art, as are ways of initiating the polymerisation reaction. The most widely recognised type of unsaturated polyester resin is the condensation reaction product of polyols and polybasic acids, at least a portion of which acid is ethylenically unsaturated, for example ethylene glycol reacted with maleic acid or acid anhydride. A resin of this type will normally contain unreacted carboxyl groups, the concentration of which is expressed as the acid value of the resin, in units of mgm KOH equivalent to one gm of the resin.

The exercise of this invention places no unusually critical requirements on the nature or acid value of the polyester resin to be used therein, other than the requirement in respect of poly(ethylene oxide) content. However, for the most stable processing conditions we have found it preferable to work with resins which have acid values of from 10–50 mgm KOH per gm.

The choice of components available to the polyester formulator is illustrated but not limited by the following examples:

Unsaturated aliphatic acids, e.g. maleic, fumaric, itaconic, citraconic and mesaconic acids.

Saturated aliphatic acids, e.g. malonic, succinic, glutaric, adipic, pimelic, azaleic, hexahydrophthalic and sebacic acids; and Aromatic acids, e.g. phthalic, iso-phthalic, terephthalic, tetrachlorophthalic, trimellitic and trimesic acids.

The corresponding acid anhydrides, where they exist, are also common components of such polyesters.

Suitable dihydric alcohols are chosen from, for example, ethylene glycol, diethylene glycol, hexane 1, 6-diol, propylene glycol, dicyclohexanol and neopentyl glycol. Alternatively the alcohol may be one which initially contained three or more hydroxyl groups, the groups in excess of two optionally being at least in part etherified with, for example, a monohydric alcohol e.g. methanol, ethanol and n-butanol, or esterified with a monobasic acid, e.g. benzoic acid, p tert-butyl benzoic acid and chain-like aliphatic acids of up to 18 carbon atoms chain length e.g. coconut oil fatty acid.

The methods by which unsaturated polyesters of this type are formulated and made are well known in the art.

As disclosed hereinabove, the requirements of this invention superimpose on the above-described formulating practices the essential requirement that the unsaturated polyester resin shall comprise 2-50% by weight of poly(ethylene oxide) chains. For some applications, the preferred range is 2-20% by weight. There are a number of ways in which a moiety of this type may be incorporated into a polyester resin. The terminal groups of poly(ethylene oxide) chains as normally prepared are usually hydroxyl, although (depending on the polymerisation method used) one group can be an alkoxy, e.g.

methoxy group. Thus, with respect to hydroxyl group concentration the poly(ethylene oxide) may be mono- or di-functional, the difunctional species commonly being referred to as poly(ethylene glycols). The nature of poly(ethylene oxides) is well known and reviewed in, for example, "Organic Polymer Chemistry", Saunders, K.J., Chapman and Hall, London, 1973. Thus, the most direct way of attaching a poly(ethylene oxide) moiety to an unsaturated polyester is to utilise its hydroxyl group or groups in an esterification reaction. For example, a mono-hydroxy-terminated poly(ethylene oxide) may be reacted through its hydroxyl group and a carboxyl group of the polyester resin to unite both components through an ester linkage. On the other hand, if the poly(ethylene oxide) chain is terminated at both ends by hydroxyl groups, it may be used as a dihydric alcohol in the preparation of the unsaturated polyester resin itself.

Poly(ethylene oxide) for use in this manner may be readily prepared by known methods from ethylene oxide and is also known commercially; for example, certain proprietary products sold under the trade mark "Carbowax" (Trade Mark of Union Carbide Corp., U.S.A.) For our purpose, the poly(ethylene oxide) must be water-soluble at the granule processing temperature and have an average molecular weight of 1000 – 10,000. Although the polymers must be essentially those of ethylene oxide, we do not exclude by the use of this term the presence therein of a minor proportion of some other alkylene oxide, for example propylene oxide, provided the poly(alkylene oxide) as a whole remains water soluble at the granule processing temperature.

An alternative indirect way of introducing poly(ethylene oxide) into the polyester is to first react a mono-hydroxyl-terminated poly(ethylene oxide) with a tribasic acid, for example trimellitic acid anhydride, in equimolar proportions, and then to use the dibasic acid ester so-formed in the unsaturated polyester resin preparation as a dibasic acid reactant.

The first step in preparing vesiculated granules by our new process, is to dissolve the selected unsaturated polyester resin in ethylenically unsaturated monomer with which it will co-react when polymerisation is initiated by a free radical mechanism. The unsaturated monomer should be essentially water-insoluble and we have found monomers with a solubility of less than 5% by weight in water to be satisfactory for our purpose.

A single monomer or a mixture of monomers may be used and in general the monomer will contain only a single polymerisable double bond. However, it is known that poly-functional monomers, that is, monomers containing more than one polymerisable double bond, are also used to cross-link unsaturated polyester resins. Such poly-functional monomers are, however, normally present only as a minor constituent of a mixture of monomers, the major proportion of which is monofunctional monomer. Hence, mixtures comprising e.g. divinyl benzene may be used in the performance of our invention.

The basis for selection of ethylenically unsaturated monomer which will react with an unsaturated polymer is well understood in the art and can be applied directly to the process of the present invention. In practice, we have found the most generally useful monomer to be styrene, because of the ease with which it can be polymerised with a broad range of unsaturated polyester resins. However, excellent results are given by blends of styrene with other monomer, notably 'vinyl toluene' and methyl methacrylate. For the best results, we prefer that the monomer shall comprise at least 50% by weight of styrene.

The choice of monomer is not, however, restricted to the above monomers alone. Bearing in mind the requirements that the total monomer must be essentially insoluble in water and also be a solvent for the unsaturated polyester resin, there may be present in a minor proportion other polymerisable unsaturated monomers to, for example, modify the physical properties of the co-reacted resins. Typical co-monomers are, for example, ethyl acrylate, n-butyl methacrylate, acrylonitrile, and triallyl cyanurate. In general, we have found that the upper limit of usefulness of such monomers is 10% by weight based on the total monomer used. Higher concentrations give granules which can be either too brittle or too rubbery to be used effectively in, for example, paint compositions.

Optionally a few percent by weight of a non-polymerising organic liquid, e.g. n-butanol or toluene, may be mixed with the monomer to increase the solubility of the polyester resin therein or may be introduced as an incidental part of the process, e.g. in preparing the polyester.

When a solution of unsaturated polyester in polymerisable monomer of this type is added to water with vigorous stirring, it forms a self-stabilising suspension of globules of polyester solution in the water. Stirring is continued vigorously until the desired globule size, which will correspond approximately to the final granule size, is achieved. Reduction of the globules to size may be hastened by the addition to the water of a limited amount, not more than 5% by weight of the polyester, of an anionic surfactant such as, for example, "Aerosol" M.A. (Aerosol is a trade mark of the America Cyanimid Co.), or a water-soluble colloid, for example hydroxy ethyl cellulose. At the same time, small discrete liquid filled vesicles form spontaneously within the globules of polyester resin solution. Each globule contains a plurality of vesicles, the diameters of which are small relative to that of the globule diameter. Vesicle volumes lie within the range of 20–60% of the globule volume.

When the globules have been reduced by stirring to the desired granule diameter, a free radicle initiator is added to the suspension to polymerise and hence cross-link the polyester resin granules. The initiator may be, for example, an organic peroxide, e.g. benzoyl peroxide, di-tert-butyl peroxide and methyl ethyl ketone peroxide, in combination with an accelerator such as for example diethyl aniline.

It has been proposed, for example in the Australian patent specifications referred to hereinabove, that the usefulness of vesiculated polymer granules is enhanced by the inclusion in them of pigments, especially opaque white pigments such as, for example, titanium dioxide. Pigment may be incorporated in the granules of this invention by pre-dispersing particles of the chosen pigment in the unsaturated polyester resin solution. In general, when the granule incorporates a proportion of pigment, we have found it preferable to adopt the option of adding up to 5% by weight of the polyester of an anionic surfactant or a water-soluble colloid, for example hydroxy ethyl cellulose, to the water in which the suspension of globules of unsaturated polyester resin solution is made.

Granules according to this process may be prepared free of external added polymeric stabiliser which appears, without prejudice to the nature of this invention, to be a contributing factor to the relative ease with which they can then be separated from the water and dried.

The slurry of granules prepared as described hereinabove may be concentrated by settling and then decantating, the granules then being centrifuged or filtered from the bulk of the remaining water. The wet granules may then be dried by, for example, tray drying in a hot air atmosphere or by using fluidized bed techniques.

Granules of the type we now disclose, that is granules of cross-linked polyester resin comprising 2–50% by weight of moieties of poly(ethylene oxide) of average molecular weight 1000–10,000 are particularly useful as components of paint films. A surprising and valuable feature of these granules is that when they are used at high concentrations by volume in the dry paint film, that is when they comprise 60–90% by volume of the film, the paints so-produced usually have improved stain resistance to that of similar formulations made from granules of the prior art referred to hereinabove.

The invention is illustrated by the following examples in which all parts are given by weight:

EXAMPLE 1

Preparation of a poly(ethylene oxide) modified unsaturated polyester resin.

A mixture of 29 parts of propylene glycol 27 parts of fumaric acid 12 parts of phthalic anhydride and 7 parts of a poly(ethylene oxide) of molecular weight 6000 known as "Carbowax"6000 (Trade Mark), were heated in a reaction vessel fitted with a stirrer, thermometer and condenser and held under total reflux conditions for 2 hours. 3.5 parts of xylene was then added to the flask and a Dean and Stark trap fitted to collect water distilled from the reaction. The reaction mixture was kept under reflux at temperature up to 210° C and water was removed until the acid value of the polyester fell to 30 mg KOH/g resin. Heating was then stopped and the reaction mixture cooled. 0.015 parts of hydroquinone was added to the resin when the temperature had fallen to 140° C and 21 parts of styrene was added when the temperature had fallen to 110° C. The product was a viscous amber coloured liquid.

EXAMPLE 2

Preparation of pigmented vesiculated polyester granules according to the invention.

14.16 parts of the polyester of Example 1 was mixed with 5.80 parts of styrene, and 16.00 parts of rutile titanium dioxide pigment was dispersed therein by high speed mixing. 0.50 parts of a paste consisting of 55% benzoyl peroxide in n-butyl benzyl phthalate was added to the dispersion and thoroughly mixed.

The above mixture was added with stirring to a mixture of 62.40 parts of water and 0.29 parts of hydroxy ethyl cellulose. The actual grade used was "Natrosol" 250 HR,("Natrosol" being a trade mark of Hercules Co., U.S.A.). After stirring for one minute 0.46 parts of an 80% aqueous solution of sodium dihexyl sulphosuccinate was added and stirring continued. A stable oil-in-water emulsion of globules of polyester resin solution in water was formed and stirring was continued until the maximum emulsion particle size observed by microscopy was 30 micron. Then, 0.16 parts of diethyl aniline was added and stirring stopped. Over a period of 1 hour the temperature rose from 20° C to 40° C indicating that an exothermic polymerization reaction was occurring. The product was a slurry of spherical pigmented vesiculated polymer granules, the vesicle volume of which was estimated by microscope examination to be about 50% of the total granule volume.

EXAMPLE 3

Comparative example of a paint composition which shows improved properties over a similar paint comprising vesiculated polymer granules of the type disclosed in Australian patent specification No. 445,277.

Paint A

To 43.86 parts of the polymer granule slurry of Example 2 was added 19.92 parts of an aqueous acrylic latex (Rohm and Haas AC 61 was used) and 16.58 parts of a 71% aqueous dispersion of rutile titanium dioxide pigment. 1.4 parts of tributyl phosphate, 16.5 parts of water and 0.18 parts of hydroxyethyl cellulose were added slowly and the mixture stirred until the viscosity reached a constant value.

Paint B

A paint similar to paint A was made, with the exception that the polymeric granules as used in paint A were substituted on a dry weight basis with vesiculated polyester resin granules of the same size range but prepared according to the teachings of Australian patent specification No. 445,277.

Paint A and paint B were drawn down side by side on a Morest hiding power chart to films of the same thickness and allowed to dry in air overnight, then aged for a further 24 hours. Stains, including a dispersion of carbon black in mineral oil, black pencil, red chalk and household dust, were then applied evenly to both paint films.

The paints were scrubbed with a rag wet with water and household detergent. It was observed that the stains were removed more readily from paint A than from paint B. In the case of the mineral oil stain, removal was almost complete from film A but very slight only from film B.

EXAMPLE 4

Preparation of pigment-free vesiculated polyester resin granules by the process of this invention.

To 90 parts of polyester resin as prepared in example 1 was added 30 parts of styrene and 3 parts of a 55% by weight paste of benzoyl peroxide in n-butyl benzyl phthalate, to form a clear solution. This solution was then added with stirring to 200 parts of water and formed therein a stable water-in-oil type dispersion.

To the dispersion so-formed was added 0.8 parts of diethylaniline, which initiated an exothermic polymerisation reaction lasting about 2 hours. The product so-produced was an aqueous slurry of polyester resin granules with a maximum diameter of about 50 micrometers, corresponding to the maximum diameter of the unpolymerised initial water-in-oil type dispersion. The granules were found to contain about 50% by volume of fine vesicles, which had formed therein spontaneously during the granule manufacturing process.

When spread on trays and exposed to a current of warm air, the slurry dried to a soft white powder.

The preparation was repeated but with the addition of 0.7 parts of hydroxyethyl cellulose to the water in which the initial oil-in-water type emulsion was made. Approximately the same degree of agitation was used in preparing the dispersion, but in this case the final maximum granule diameter was of the order of 20 micrometer, thus showing the usefulness of a water-soluble colloid in aiding size reduction of granules during this process. The size and degree of vesiculation and the facility with which these granules could be dried, closely resembled those of the 50 micrometer granules.

EXAMPLE 5

This example illustrates the preparation of 30 micrometer pigmented vesiculated polymeric polyester resin granules according to the invention.

To 14.16 parts of the poly(ethylene oxide) modified polyester of Example 1 was added 5.80 parts of styrene, then 16.00 parts of rutile titanium dioxide pigment was dispersed therein by high speed mixing. 0.50 parts of a paste consisting of 55% by weight benzoyl peroxide in n-butyl benzoyl phthalate was added to the dispersion and thoroughly mixed.

The above mixture was added with stirring to a mixture of 62.40 parts of water, 0.29 parts of hydroxy ethyl cullulose (as in example 2) and 0.52 parts of a 30% aqueous solution of a polyphosphate pigment dispersant. After stirring for one minute, 0.46 parts of an 80% aqueous solution of sodium dihexyl sulphosuccinate was added and stirring continued. A stable oil-in-water type dispersion was formed and stirring was continued until the maximum disperse particle size observed by microscopy was 30 micrometers, after which 0.16 parts of diethyl aniline was added and stirring stopped. Over a period of 1 hour the temperature rose from 20° C to 40° C indicating that an exothermic polymerisation reaction was occurring. The product was a slurry of spheroidal pigmented vesiculated polyester granules, the vesicle volume of which was about 50% of the total granule volume. The aqueous slurry of granules was dried after washing to give a soft powder of pigmented vesiculated granules.

EXAMPLE 6

Preparation 5 micrometer pigmented vesiculated polymeric polyester resin granules according to the invention.

To 27 parts of the poly(ethylene oxide) modified polyester of example 1 was added 11 parts of styrene and 31 parts of a rutile titanium dioxide pigment was dispersed therein. To this blend was then added 1 part of a 55% by weight paste of benzoyl peroxide in n-butyl benzyl phthlate. The above dispersion was added with stirring to a mixture of 118 parts of water, 1.8 parts of hydroxyethylcellulose and 1.6 parts of sodium dihexyl sulphosuccinate. An oil-in-water type dispersion was formed, the particle size of which was reduced by vigorous mixing to an average value of about 5 micrometers. 16 parts of water and 0.3 parts of diethylaniline were added and an exothermic reaction was observed to take place over a period of about 2 hours. The product was a slurry of pigmented vesiculated polymer granules of an average size of about 5 micrometers. This was dried after washing to give a dry powder of pigmented vesiculated polyester granules.

EXAMPLE 7

Preparation according to the invention of pigmented polyester resin granules with a low vesicle volume.

To 27 parts of the poly(ethylene oxide) modified polyester of Example 1 was added 11 parts of styrene, then 31 parts of a rutile titanium dioxide pigment were dispersed therein. Next, 1 part of a 55% by weight paste of benzoyl peroxide in n-butyl benzyl phthalate was added. This mixture was then added with stirring to an aqueous phase consisting of 120 parts of water, 0.5 parts of hydroxyethyl cellulose, 3.5 parts of sodium chloride and 0.5 parts of sodium dihexyl sulphosuccinate. An oil-in-water type dispersion was formed, the disperse particles of which were reduced by stirring to approximately 30 micrometers maximum diameter. Then, 0.3 parts of diethylaniline was then added to the dispersion and an exothermic curing reaction was observed to take place over a period of 2 hours. The product was a slurry of pigmented polyester granules up to 30 micrometers in diameter and with a vesicle volume about 20% of the total granule volume. The slurry dried in a current of warm air to a soft white powder.

EXAMPLE 8

This example illustrates the preparation of vesiculated polyester resin granules according to the invention.

A poly(ethylene oxide)modified polyester suitable for the preparation of vesiculated polyester resin granules according to the invention was prepared as follows: 33 parts of a methoxy poly(ethylene oxide) (containing one terminal methoxy and a terminal hydroxyl group per molecule) of average molecular weight 2100 was added to a reaction vessel fitted with a stirrer, thermometer and condenser together with 5 parts of xylene and 3.2 parts of trimellitic anhydride. This mixture was held under reflux at about 160° C until the anhydride group concentration by infra-red analysis had fallen to a constant low value. The mixture was cooled to 130° C and 4 parts of phthalic anhydride, 14 parts of fumaric acid and 13 parts of propylene glycol were added. The mixture was heated to reflux and held for 1 hour. A Dean & Stark trap was then fitted to collect water condensed from the reaction. The mixture was kept under reflux at temperatures up to 210° C and water was removed until the acid value of the polyester fell to 30 mg KOH/g resin. Heating was then stopped and the reaction mixture cooled. 0.015 parts of hydroquinone was added when the temperature had fallen to 140° C and 26 parts of styrene was added when the temperature had fallen to 110° C. The product was a viscous turbid amber coloured liquid.

The polyester resin so-produced was then used to prepare vesiculated granules by the methods described in examples 4–7. Granules of similar properties were obtained from the polyester of this example to those obtained from the polyester of example 1.

EXAMPLE 9

This example illustrates the preparation of vesiculated polyester resin granules according to the invention using various poly(ethylene oxide) modified polyester resins as described hereunder:

(a) A poly(ethylene oxide) modified polyester was prepared by the method of example 1, but with the substitution of one half of the propylene glycol with neopentyl glycol on an equimolar basis.

(b) A poly(ethylene oxide) modified polyester resin was prepared by the method of example 1, but with the substitution of the fumaric acid with maleic anhydride on a equimolar basis.

(c) A poly(ethylene oxide) modified polyester resin was prepared by the method of example 1, but with the substitution of 10 percent by weight of the styrene monomer with methyl methacrylate monomer.

(d) A poly(ethylene oxide) modified polyester resin was prepared by the method of example 1, but with the substitution of 10 percent by weight of the styrene monomer with vinyl toluene monomer.

The above polyesters were converted in turn into vesiculated polymer granules by the method of example 2 and found to give satisfactory vesiculated polyester resin granules.

EXAMPLE 10

This example illustrates by way of comparison processes for preparing vesiculated polyester resin granules outside the scope of the present invention.

Vesiculated polyester granules were attempted to be prepared, wherein the polyester resins were as follows.

(a) A polyester resin was prepared by the method of example 1 but using 70 parts of a 6000 molecular weight poly(ethylene oxide) in place of 7 parts thereof.

The product when cooled was a semi solid and could not be converted into vesiculated polymer granules by the method of the invention.

(c) A polyester resin was prepared by the method of example 1 but using 1 part of poly (ethylene oxide) molecular weight 6000 in place of 7 parts thereof.

The product was a viscous amber liquid which did not produce a stable dispersion in water by the method of example 2 and could not be cured to give a dispersion of vesiculated polyester resin granules according to the invention.

(c) A polyester resin was prepared by the method of example 1 but using an equal weight of a poly(ethylene oxide) of average molecular weight 600 in place of the poly(ethylene oxide) of average molecular weight 6000.

The product was a viscous amber liquid which did not form a stable dispersion in water by the method of Example 2 and could not be cured to give a dispersion of vesiculated polyester resin granules according to the invention.

We claim:

1. A process of preparing an aqueous slurry of vesiculated polyester resin granules by stirring into water a solution of an unsaturated polyester resin in ethylenically unsaturated monomer to form an oil-in-water dispersion in the water of globules of the unsaturated polyester resin solution and then adding to the dispersion a free radical initiator to initiate co-reaction of the unsaturated polyester resin and ethylenically unsaturated monomer, the process being further characterised in that;
    (1) the polyester resin shall comprise from 2-50% by weight of poly(ethylene oxide) chains of average molecular weight 1000 – 10,000, which are water soluble at the granule processing temperature and
    (2) the ethylenically unsaturated monomer shall have a solubility of less than 5% by weight in water.

2. A process according to claim 1 in which the unsaturated polyester resin has an acid value of 10–50 mgm KOH per gm.

3. A process according to claim 1 in which the ethylenically unsaturated monomer comprises at least 50% by weight of styrene.

4. A process according to claim 3 in which the ethylenically unsaturated monomer comprises up to 10% by weight of monomer selected from the group consisting of ethyl acrylate, n-butyl methacrylate, acrylonitrile and triallyl cyanurate.

5. A process according to claim 1 in which the dispersion in water of globules of unsaturated polyester resin solution is made in the presence in the water of up to 5% based on the weight of polyester resin of an anionic surfactant or a water-soluble colloid.

6. A process of preparing vesiculated polyester resin granules wherein granules are separated from the water of an aqueous slurry prepared according to claim 1 and the separated granules dried.

* * * * *